United States Patent [19]

Constantinides et al.

[11] 4,371,946
[45] Feb. 1, 1983

[54] SERVOMECHANISM FOR DOPPLER SHIFT COMPENSATION IN OPTICAL CORRELATOR FOR SYNTHETIC APERTURE RADAR

[75] Inventors: Nicholas J. Constantinides; Thomas J. Bicknell, both of Pasadena, Calif.

[73] Assignee: The United States of America as represented by the Administrator of the National Aeronautics and Space Administration, Washington, D.C.

[21] Appl. No.: 195,547

[22] Filed: Oct. 9, 1980

[51] Int. Cl.³ .................. G01S 13/90; G06G 7/66
[52] U.S. Cl. .................. 364/822; 250/203 R; 343/5 CM; 343/100 CL; 364/861
[58] Field of Search ........... 364/822, 861; 250/201, 250/203; 343/5 CM, 5 FT, 5 MM, 100 CL

[56] References Cited

U.S. PATENT DOCUMENTS

| | | | |
|---|---|---|---|
| 3,435,232 | 3/1969 | Sorensen | 250/203 R |
| 3,470,377 | 9/1969 | Le Febre et al. | 250/203 R |
| 3,560,973 | 2/1971 | Kazel | 343/100 CL |
| 3,715,599 | 2/1973 | Marcy | 250/201 X |
| 3,905,031 | 9/1975 | McCord | 343/5 MM X |
| 3,950,747 | 4/1976 | Waddoups | 343/5 CM |
| 4,054,878 | 10/1977 | Diehl | 343/100 CL X |
| 4,099,249 | 7/1978 | Casasent | 364/822 |
| 4,129,775 | 12/1978 | O'Meara | 250/203 R |
| 4,156,875 | 5/1979 | Keane et al. | 343/5 FT X |

Primary Examiner—Felix D. Gruber

Attorney, Agent, or Firm—Monte Mott; John Manning; Paul McCaul

[57] ABSTRACT

A method and apparatus for correcting doppler shifts in synthetic aperture radar data. More particularly, in an optical correlator (10) for synthetic aperture radar data having a means for directing a laser beam (22) at a signal film (12) having radar return pulse intensity information recorded thereon, a resultant laser beam (32) then passing through a range telescope (34), an azimuth telescope (38), and a Fourier transform filter (36) located between the range and azimuth telescopes, thereby forming an image for recordation on an image film (40), a compensation means for doppler shift in the radar return pulse intensity information includes a beam splitter (46) for reflecting the modulated laser beam, after having passed through the Fourier transform filter (36), to a detection screen (48) having two photodiodes (66 and 68) mounted thereon. The photodiodes are positioned on each side of the Gaussian distribution of the Fourier transform spectrum reflected by the beam splitter (46). Doppler shifts in the synthetic aperture radar data are detected by a shifting of the Gaussian distribution curve in one direction or the other, thus resulting in unequal light level intensities at the two photodetectors (66 and 68). Control electronics (52) are disclosed for processing this unequal light level intensity and controlling appropriate optical elements in the optical correlator in order to compensate for the doppler shift. Control is effected until the light level intensities at the two photodetectors are again equal.

16 Claims, 5 Drawing Figures

SERVOMECHANISM FOR DOPPLER SHIFT COMPENSATION IN OPTICAL CORRELATOR FOR SYNTHETIC APERTURE RADAR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

TECHNICAL FIELD

The invention relates to optical correlators for synthetic aperture radar data, and more particularly to a means and method of compensation of doppler shifts present in the radar data.

BACKGROUND ART

One of the major processing problems encountered in optically correlating synthetic aperture radar data from spacecraft radars is accurately determining the attitude of the spacecraft with respect to the rotating earth. Orbital parameters are necessary in order to reduce synthetic aperture radar data on the ground; and without accurate knowledge of these parameters ambiguities are introduced in the final imaging process. These ambiguities appear in the form of double or overlapping image or data gaps.

For a given optical correlation process required to produce target imagery of synthetic aperture radar, optical parameters of the correlator elements, that is, aperture size, focal lengths, etc., are directly related to the orbital parameters of the synthetic aperture radar instrument. These parameters are fixed and based on predetermined orbital parameters (predicts) of the spacecraft, and are only as accurate as the assumptions made of the spacecraft's path and the synthetic aperture radar instrument's boresight coordinates with respect to a rotating earth. Occasionally these predicts are inaccurate, and most often are unavailable during actual correlation of the synthetic aperture radar data. The synthetic aperture radar instrument boresight coordinates, when inaccurate, produce inaccurate correlator element settings which result in image ambiguities. Most often ambiguities that are introduced are due to the spacecraft's attitude control deviations. These ambiguities are introduced into the ultimate synthetic aperture radar image by a shift in the doppler/spectrum due to a spacecraft attitude change. When a doppler shift occurs, the optical correlator operator generally stops the imaging process and repositions several optical elements, thereby recentering the spectrum of the output from a Fourier transform filter in order to avoid target image ambiguities. This manual repositioning significantly slows the optical correlation process and decreases the throughput rate of an optical correlator. The present invention solves this problem by providing a closed loop correction system for detecting and automatically altering at least one of the optical elements to compensate for doppler shift, thereby eliminating a need for the previously described manual correction.

STATEMENT OF INVENTION

In an optical correlator for synthetic aperture radar data compression having a means for directing a laser beam at a signal film having return pulse intensity information recorded thereon, a resultant modulated laser beam then passing through a range telescope, an azimuth telescope, and a Fourier transform filter located between the range and azimuth telescopes, thereby forming an image for recordation on an image film, the invention provides a compensation means for a doppler shift in the radar return pulse intensity information which includes a first means for continuously detecting doppler shifts in the radar return, and a second means responsive to the first means for continuously controlling the angle of incidence between the laser beam and the signal film surface whereby the doppler shift is reduced to below a predetermined minimum doppler shift. The invention also provides a method for continuously detecting the doppler shift and for continously controlling the angle of incidence between the laser beam and the signal film surface so that the doppler shift is reduced to a predetermined minimum shift.

In an exemplary embodiment of the invention, the first means includes a beam splitter located between the Fourier transform filter and the azimuth telescope for reflecting a portion of the modulated laser beam to a plane containing two photodiodes, the plane being the focal plane of the reflected energy from the beam splitter. The photodiodes are positioned with respect to the reflected laser beam's Gaussian distribution so that they each experience the same light intensity in the absence of a doppler shift. As doppler shifts occur, the Gaussian distribution shifts either in one direction or the other, thereby creating unequal intensities and thus currents in the photodiodes. The difference in intensity at each of the diodes is utilized to determine the direction of doppler shift and the sum of the two intensities is utilized to determine the magnitude of doppler shift. A rotatable reflective surface connected to a motor directs the laser beam at the signal film. The motor is responsive to signals generated from intensity differences at the two photodiodes, and rotates the reflective surface until the intensities at the photodiodes are equal. The exemplary embodiment also provides a means for preventing a doppler correction until the intensity differences exceed a predetermined ratio, and a delay for effecting a doppler correction until a predetermined difference between the two intensities has occurred for a predetermined time, thereby assuring that a strong target spectrum in the Fourier transform plane does not trigger a doppler shift correction. In a specific application, it has been found that an eight second delay is long enough to avoid this ambiguity, but short enough not to interfere with the correction of actual doppler shifts.

BEST MODE FOR CARRYING OUT THE INVENTION

A detailed illustrative embodiment of the invention disclosed herein exemplifies the invention and is currently considered to be the best embodiment for such purposes. It is provided by way of illustration and not limitation of the invention. Various modifications thereof will occur to those skilled in the art, and such modifications are within the scope of the claims which define the present invention.

As previously described, an optical correlator for synthetic aperture radar data compression having a means for detecting and tracking doppler shifts in the radar data is disclosed. The optical correlator includes a means for directing a laser beam at a signal film having radar return pulse intensity and phase information recorded thereon. A resultant modulated laser beam from the signal film is directed to a range telescope, an azimuth telescope, and a Fourier transform filter which is located between the range and azimuth telescopes. The azimuth telescope forms an image for recordation on an image film. The compensation means includes a beam splitter located between the Fourier transform filter and the azimuth telescope. The beam splitter reflects a portion of the modulated light beam after its virtual image and DC components have been removed by the Fourier transform filter. Photodiodes are located on the focal plane of the reflected light so that each detects intensity on one side of the Gaussian distribution of the light output of the Fourier transform filter. The photodiodes are positioned so that each detects the same intensity when there is no doppler shift. Doppler shifts are then detected by unequal intensities at the photodiodes, thereby generating an output signal that is used to alter the angle of incidence between the laser beam and the signal film until the two light intensities are equal. Thus, a closed loop system is provided wherein effects of doppler shifts are continually detected and corrected as the radar data is processed and transferred onto the image film.

Figure 1:
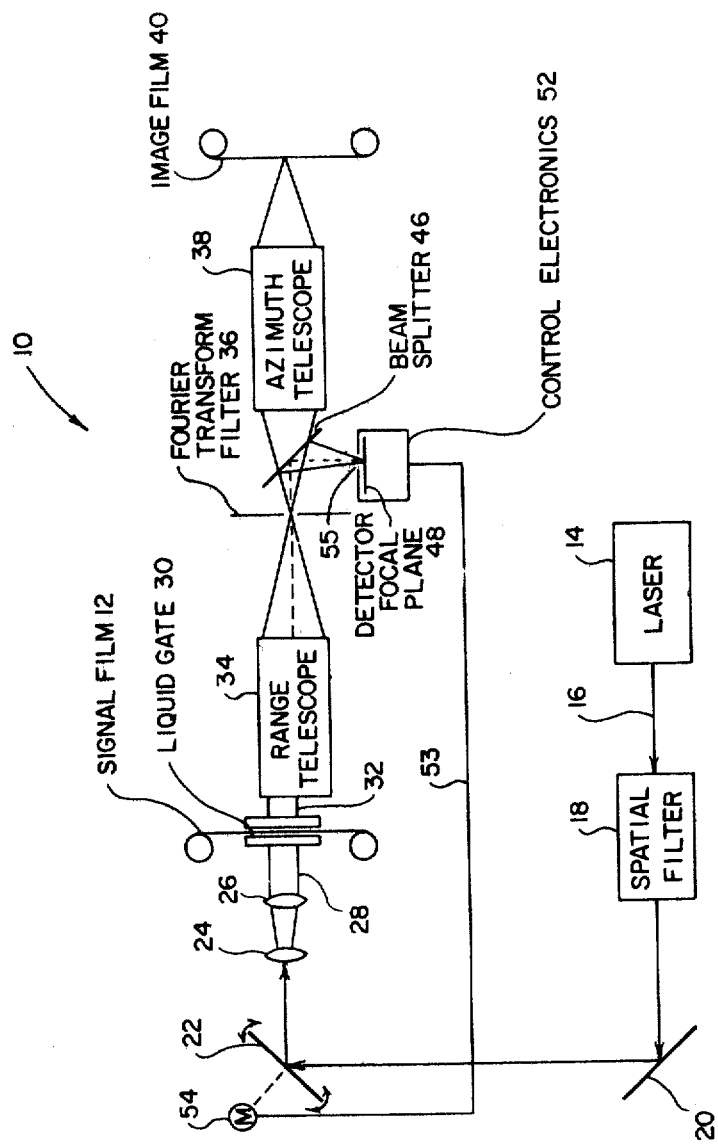
FIG. 1 is a block diagram showing the optical correlator and doppler shift compensation means provided by the invention.

Referring now to FIG. 1, an optical correlator 10 for synthetic aperture radar data compression can be seen. The synthetic aperture radar data is recorded on a signal film 12 so that each horizontal line thereon is formed from a radar return pulse, the intensity of the line corresponding to the amplitude of the radar pulse. A coherent, monochromatic light source such as a laser 14, which could be a helium-neon laser or an argon-krypton laser, is oriented to direct a laser beam 16 through a spatial filter 18 to a first reflecting surface 20. The laser beam is reflected from the first reflecting surface 20 to a second reflective surface 22 from which it is reflected to a beamwidening lens 24 and a collimating lens 26. The output from the collimating lens 26 is a collimated laser beam 28 directed to the signal film 12 through a liquid gate 30. A modulated laser beam 32, the modulation occurring as a result of interaction between the synthetic aperture radar data on the signal film 12 and the laser beam 28, passes to a range telescope 34, the output of which is focused on a Fourier transform filter 36. The Fourier transform filter is configured to remove the virtual image and DC spot from the output of the range telescope 34, these images being formed as a result of modulation of the laser beam 28 by the signal film 12. The output of the Fourier transform filter 36 thus comprises a real image portion of the modulated laser beam 32 and is provided to an azimuth telescope 38, the output of which is focused on an image film 40. The above describes a typical optical correlator for synthetic aperture radar data and is well understood by those familiar with the art.

As previously explained, doppler shifts in return radar pulses produce ambiguities which appear in the signal film 12 as blurs, double images, or image gaps on the image film 40 unless removed or otherwise compensated for. The conventional method of removing such doppler shifts is to manually alter the angle of incidence between the collimated laser beam 28 and the signal film 12 after having noticed a reduction in sharpness of the image being recorded on the image film 40. A means for automatically tracking and correcting for these doppler shifts is provided by a beam splitter 46 located in the modulated laser beam after having passed through the Fourier transform filter 36. The portion 50 of the modulated laser beam reflected by the beam splitter 46 is focused on a focal plane 48 for, as will be explained below, detecting light intensities at two cross-sectional portions of the reflected beam 50. A control electronics unit 52 processes the light intensity information and generates a motor control signal on a control line 53 to a motor 54 which is operatively connected to the second reflecting surface 22. An aperture 55 is provided in the control electronics unit 52 in order to minimize the distance between the focal plane 48 and processing circuitry to be explained below. The control electronics 52 are chosen to cause the motor 54 to rotate the second reflective surface 22 until the intensity at the two portions of the reflected beam 50 are equal. Although in the exemplary embodiment described herein the motor 54 rotates the second reflective surface 22 in order to alter the angle of incidence between the collimated light beam 28 and the signal film 12, it should be appreciated that the signal film 12 could also have been rotated with respect to the collimated light beam 28 in order to correct for doppler shift. Also, it should be understood that the beam splitter 46 could have been placed between the range telescope 34 and the Fourier transform filter 36. A second Fourier transform filter could then have been placed between the beam splitter 46 and the detector focal plane 40.

Figure 3:
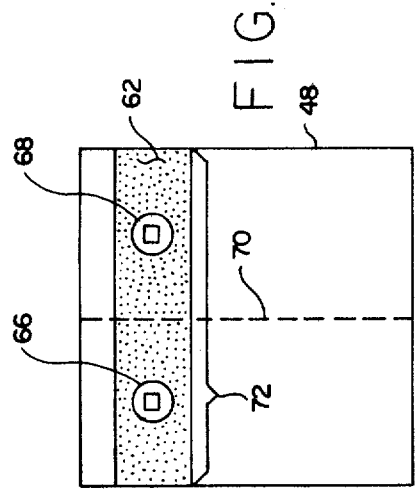
FIG. 3 shows the location of the two photodetectors with respect to the reflected output of the Fourier transform filter.
Figure 4:
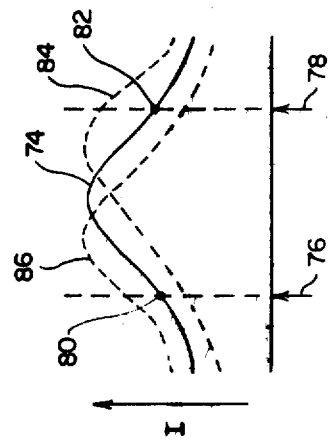
FIG. 4 is a diagram showing intensity of the modulated laser beam at the detection screen as a function of zero, positive and negative doppler shifts.
Figure 2:
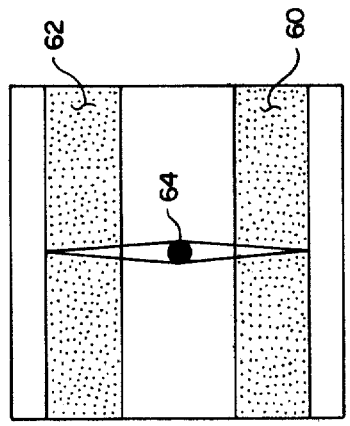
FIG. 2 shows the spectrum of the modulated laser beam at the input to the Fourier transform filter.

The focused spectrum of the output of the range telescope 34 at the Fourier transform filter 36 can be seen in FIG. 2. It consists of a virtual image spectrum 60, a real image spectrum 62 and a DC component 64. The Fourier transform filter 36 blocks the DC component 64 and the virtual image spectrum 60, and passes the real image spectrum 62. The detector focal plane 48 then sees only the real image spectrum 62 as shown in FIG. 3. In addition, the detector focal plane 48 has mounted thereon a first photodetector 66 and a second photodetector 68 which could be photodiodes. The first and second photodetectors 66 and 68 are symetrically mounted with respect to the center of the real image spectrum as shown by the dotted lines 70. If no doppler shifts exist in the synthetic aperture radar data, the intensity across the real image as shown at 72 is in the form of a Gaussian distribution as seen in FIG. 4 at 74. The first and second photodetectors 66 and 68 monitor this intensity at points corresponding to the arrows shown at 76 and 78. Thus, the first photodetector 66 sees an intensity as shown at 80 and the second photodetector 68 sees an intensity as shown at 82 when there is no doppler shift. These two intensities are the same due to a normal Gaussian distribution of the intensity spectrum. However, a doppler/shift in one direction moves the Gaussian distribution curve to the right as shown at 84, and a doppler shift in the other direction moves the Gaussian distribution curve to the left as shown at 86. In regard to a doppler shift the one direction, it can be seen that the difference in intensity between the first and second photodetectors 66 and 68 would result in a negative intensity value $V_D$ whereas a doppler shift in the other direction would result in a difference in intensity between the first and second photodetectors 66 and 68 providing a positive intensity value $V_D$. Thus, the sign of the difference in intensity between the first and second detectors 66 and 68 can be utilized to determine the direction of doppler shift of the received radar data. As will be explained below, this sign can then be used for determining the direction of rotation of the second reflective surface 22 as shown in FIG. 1.

Figure 5:
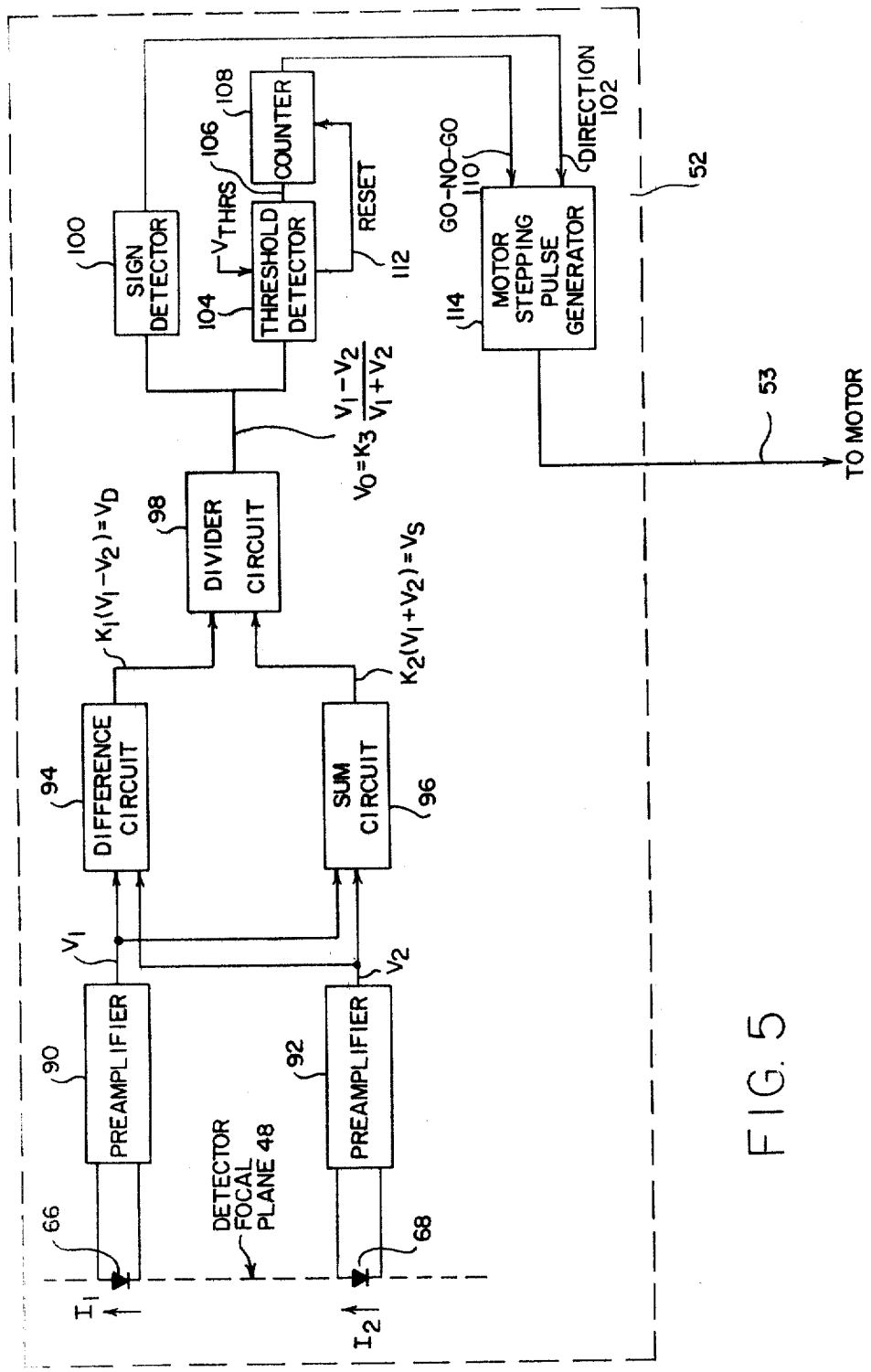
FIG. 5 is a block diagram showing the control electronics for generating a control signal for the motor shown in FIG. 1.

FIG. 5 shows a block diagram of the control electronics 52. The first photodetector 66 generates a current shown as $I_1$, and the second photodetector 68 generates a current shown as $I_2$. $I_1$ is provided to a first preamplifier 90 which generates a voltage $V_1$ related to $I_1$. $I_2$ is provided to a second preamplifier 92 which generates a voltage $V_2$. A difference circuit 94 provides an output $V_D$ which is related to the first voltage $V_1$ minus the second voltage $V_2$. The sign of $V_D$ will be positive when $V_1$ is greater than $V_2$, and will be negative when $V_2$ is greater than $V_1$. A sum circuit 96 provides an output $V_S$ which is related to the sum of the two voltages $V_1$ and $V_2$. As can be appreciated, $V_D$ is related to the position of the intensity spectrum with respect to a nominal spectrum as shown in FIG. 4 at 74, and is also related to the actual spectrum intensity. $V_S$ is only related to the spectrum intensity. A divider circuit 98 provides an output voltage $V_O$ which is related to the ratio of $V_D$ to $V_S$. The sign of $V_O$ is detected by a sign detector 100, the output of which is provided on a direction line 102 and indicates the direction of doppler shift. $V_O$ is also provided to a threshold detector 104 which provides an output pulse on a threshold exceed line 106 whenever $V_O$ exceeds a predetermined threshold signal $V_T$. The signal on the threshold exceed line 106 is provided to a counter 108 which begins a time-out cycle as soon as $V_T$ is exceeded by the absolute value of $V_O$. After a predetermined time interval, the counter 108 provides an output signal on a go-no-go line 110 which iniates generation of the motor control signal. Whenever $V_O$ drops below $V_T$, a pulse is provided on a reset line 112 which prevents the counter 108 from counting. A motor stepping pulse generator 114 in response to the go-no-go signal on line 110 and direction signal on line 102 provides appropriate stepping signals to the motor 54 on the motor control line 53.

In a specific application, the counter 108 is chosen to introduce an eight second delay after $V_O$ exceeds $V_T$ before providing a go signal on the go-no-go line 110. This delay is introduced into the system to assure that a strong target spectrum in the Fourier transform plane does not trigger doppler tracking action. It has been found that an eight second time delay is more than enough to avoid this ambiguity, but short enough not to interfere with actual doppler shift corrections. In a specific application, the sign detector is chosen to provide a one output to correct for positive doppler shifts, and a zero output to correct for negative doppler shifts, the zero or one thereby causing the motor 54 to rotate the second reflective surface 22 in an appropriate direction. Similarly, the counter 108 is chosen to provide a one output when $V_O$ exceeds $V_T$ for more than eight seconds, and a zero output when it does not. The one output from the counter 108 is required in order for the motor stepping pulse generator 114 to respond to a one or zero on the direction line 102.

Thus, it can be appreciated that an electro-optical doppler tracker for optical correlation of synthetic aperture radar data has been described wherein spatial shifts in the information contained within an optical Fourier transform of laser beam modulated by the radar data can be utilized for optical centering of synthetic aperture radar imagery as it is being processed for recordation on an image film.

What is claimed is:

1. In an optical correlator for synthetic aperture radar data compression having a means for directing a laser beam at a signal film having radar return pulse intensity and phase information recorded thereon, a resultant modulated laser beam then passing through a range telescope, an azimuth telescope, and a Fourier transform filter located between said range and azimuth telescopes, thereby forming an image for recordation on an image film, a compensation means for a doppler shift compensation in said radar return pulse intensity information comprising:

first means optically coupled to monitor the Fourier transform of said modulated laser beam at the output of said range telescope for continuously detecting doppler shift in said radar return and generating a control signal indicative of the sign and magnitude of said doppler shift; and second means responsive to said control signal for continuously controlling the angle of incidence between said laser beam and said signal film whereby said doppler shift is reduced to below a predetermined minimum shift, thereby minimizing image ambiguities.

2. The compensation means of claim 1 wherein said first means comprises:

a beam splitter located between said Fourier transform filter and said azimuth telescope for reflecting a portion of said modulated laser beam; and means for detecting light intensity differentials between two portions of said reflected modulated laser light beam, said light intensity differentials being related to said doppler shift.

3. The compensation means of claim 2 wherein said means for detecting comprises first and second photodetectors positioned on either side of a centered lobe of said reflected modulated laser light beam, said first and second photodetectors providing first and second light intensity related output signals, respectively.

4. The compensation means of claim 3 wherein said optical correlator further includes a reflective surface for reflecting said laser beam to said signal film and a motor means responsive to a control signal for controlling the angle of said reflective surface relative to said laser beam, said second means comprising:

third means for generating a difference signal related to a difference between said first and second photodetector output signals;

fourth means for generating a sum signal related to the sum of said first and second photodetector output signals; and means responsive to said third and fourth means for generating said control signal.

5. The compensation means of claim 4 wherein said means responsive to said third and fourth means comprises:

means for developing a ratio signal related to the ratio of said difference signal to said sum signal; and means for developing a signal having a first voltage state when said ratio signal is positive and a second voltage state when said ratio signal is negative, said first and second voltage states indicating a direction of change of said reflective surface angle relative to said laser beam to be effected by said control signal.

6. The compensation means of claim 5 wherein said means responsive to said third and fourth means further comprises means for thresholding said control signal until said ratio signal exceeds a predetermined absolute value.

7. The compensation means of claim 6 wherein said means responsive to said third and fourth means further comprises timing means for inhibiting said control signal for a predetermined time after said ratio signal exceeds said predetermined absolute value.

8. A synthetic aperture radar data optical correlator having means for detecting and tracking doppler shifts in said radar data comprising:

a reflective surface for directing a laser beam at a signal film containing said radar data;

a range telescope positioned to receive said laser beam after being modulated by said radar data;

a Fourier transform filter for removing a DC component and a virtual image component from said modulated laser beam;

an azimuth telescope for focusing said modulated laser beam, after having passed through said Fourier transform filter, on an image film;

first means for determining first and second light level intensities at two cross-sectional portions of said modulated laser beam after having passed through said Fourier transform filter; and second means responsive to said first means for altering the angle of said reflective surface with respect to said laser beam reflected therefrom until the light level intensities at said two cross-sectional portions have a predetermined relationship with respect to each other.

9. The optical correlator of claim 8 wherein said first means comprises;

a beam splitter located in the path of said modulated laser beam after having passed through said Fourier transform filter for reflecting a portion of said modulated laser beam; and first and second light level detecting means located in said reflected modulated laser beam for determining said first and second light level intensities.

10. The optical correlator of claim 9 wherein said first and second light detecting means comprise first and second photodetectors symetrically located with respect to each other on opposite sides of a DC spot portion of said modulated laser beam.

11. The optical correlator of claim 9 wherein said second means comprises:

electronic processing means responsive to said first and second light level intensities for generating a motor control signal related to intensity differences therebetween; and motor means connected to said reflective surface and responsive to said motor control signal for altering the angle of said reflective surface until said cross-sectional portion light intensities have said predetermined relationship with respect to each other.

12. The optical correlator of claim 11 wherein said electronic processing means comprises:

difference means for generating a signal related to the difference between said first and second light level intensities;

sum means for generating a signal related to the sum of said first and second light level intensities;

sign means responsive to said difference means for determining the direction of alteration of the angle of said reflective surface; and threshold means responsive to said difference means and said sum means for determining when said motor signal should be applied to said motor, said motor control signal being applied to said motor when the ratio between said difference means signal and said sum means signal exceeds a predetermined absolute ratio.

13. The optical correlator of claim 12 further comprising means for inhibiting said motor control signal from said motor until the ratio between said difference means signal and said sum means signal exceeds said predetermined absolute ratio for a predetermined time interval.

14. The optical correlator of claim 8 wherein said predetermined ratio between said light level intensities at said two cross-sectional portions is one.

15. The optical correlator of claim 9 wherein said laser beam is generated by a helium-neon laser.

16. In an optical correlator for synthetic aperture radar data having a means for directing a laser beam at a signal film having radar return pulse information recorded thereon, a resultant modulated laser beam then passing through a range telescope, an azimuth telescope, and a Fourier transform filter located between said range and azimuth telescopes, thereby forming an image for recordation on an image film, a method for compensating for a doppler shift in said radar return pulse intensity information comprising the steps of:

determining first and second light level intensities at two portions of said modulated laser beam after passing through said range telescope; and altering in response to said determining step the angle of incidence between said laser beam and said signal film until the light level intensities at said two cross-sectional portions have a predetermined relationship with respect to each other, said predetermined relationship being chosen to define zero doppler in said radar return pulse intensity information.

* * * * *